US010130110B2

(12) United States Patent
Klimke et al.

(10) Patent No.: US 10,130,110 B2
(45) Date of Patent: Nov. 20, 2018

(54) DEPOSITING MACHINE HAVING A PLUG-IN CONNECTION

(71) Applicant: BÜHLER AG, Uzwil (CH)

(72) Inventors: Ralf Klimke, Altena (DE); Stefan Zimmermann, Bergneustadt (DE); Frank Huperz, Bergneustadt (DE); Michael Paul, Bergneustadt (DE)

(73) Assignee: Bühler AG, Uzwil (CH)

( * ) Notice: Subject to any disclaimer, the term of this patent is extended or adjusted under 35 U.S.C. 154(b) by 38 days.

(21) Appl. No.: 15/306,158

(22) PCT Filed: Apr. 21, 2015

(86) PCT No.: PCT/EP2015/058562
§ 371 (c)(1),
(2) Date: Oct. 24, 2016

(87) PCT Pub. No.: WO2015/162114
PCT Pub. Date: Oct. 29, 2015

(65) Prior Publication Data
US 2017/0042175 A1    Feb. 16, 2017

(30) Foreign Application Priority Data
Apr. 25, 2014  (EP) .................................... 14166037

(51) Int. Cl.
*A23G 1/04*    (2006.01)
*A23G 1/20*    (2006.01)
(Continued)

(52) U.S. Cl.
CPC ............. *A23G 1/045* (2013.01); *A23G 1/206* (2013.01); *A23G 3/021* (2013.01); *A23G 3/0257* (2013.01);
(Continued)

(58) Field of Classification Search
CPC ........ A23G 1/045; A23G 1/206; A23G 3/021; A23G 3/0257; B01F 15/00922; B01F 15/0278; B01F 2215/0019
(Continued)

(56) References Cited

U.S. PATENT DOCUMENTS 2,850,990 A *  9/1958  Rasmusson ............ A23G 3/203
                                                    222/135
3,907,472 A *  9/1975  Lutsey .................... A23G 9/20
                                                    425/126.1
(Continued)

FOREIGN PATENT DOCUMENTS

EP    0 213 709 A1    3/1987
EP    2 353 401 A1    8/2011
(Continued)

OTHER PUBLICATIONS

European Search Report Corresponding to 14166037.3 dated Nov. 3, 2014.
(Continued)

*Primary Examiner* — Nicholas J Weiss
*Assistant Examiner* — Andrew P Bainbridge
(74) *Attorney, Agent, or Firm* — Davis & Bujold PLLC; Michael J. Bujold (57) ABSTRACT

A depositing machine (1) comprising a removable component, a method for inserting the removable component (10) in a machine frame (2) of a depositing machine, a method for removing the removable component (10) from a machine frame (2) of a depositing machine (1), and a kit for retrofitting a depositing machine (1) with the removable component (10). The component (10) is fastened to the machine frame (2) by a substantially horizontally arranged plug-in connection (11), in particular, a bolt connection.

31 Claims, 10 Drawing Sheets

(51) Int. Cl.
*A23G 3/02* (2006.01)
*B01F 15/00* (2006.01)
*B01F 15/02* (2006.01)

(52) U.S. Cl.
CPC .... *B01F 15/00922* (2013.01); *B01F 15/0278* (2013.01); *B01F 2215/0019* (2013.01)

(58) Field of Classification Search
USPC .............................................. 222/333; 426/5
See application file for complete search history.

(56) References Cited

U.S. PATENT DOCUMENTS

| | | | | |
|---|---|---|---|---|
| 3,932,931 | A * | 1/1976 | Wright | H05K 13/0417 29/707 |
| 4,033,243 | A * | 7/1977 | Kirrish | F16B 37/145 411/338 |
| 4,666,066 | A * | 5/1987 | Boccagno | B29B 13/022 219/421 |
| 4,867,351 | A * | 9/1989 | Grune | B65B 3/32 222/307 |
| 5,286,181 | A * | 2/1994 | Schwager | A23G 3/0247 264/13 |
| 5,571,406 | A * | 11/1996 | Mensching | B01D 29/01 210/154 |
| 5,590,474 | A * | 1/1997 | Lamb | B25B 27/16 29/271 |
| 5,699,938 | A * | 12/1997 | Siddiqui | B05C 11/1042 219/421 |
| 6,957,748 | B1 * | 10/2005 | Erdman | G01F 11/44 222/1 |
| 7,618,251 | B2 * | 11/2009 | Steiner | A23G 1/0066 222/439 |
| 7,874,456 | B2 * | 1/2011 | Bolyard, Jr. | B05C 11/1042 137/884 |
| 8,201,716 | B2 * | 6/2012 | Chastine | B05C 5/001 137/875 |
| 8,936,178 | B2 * | 1/2015 | Ganzer | B05C 11/10 222/146.2 |
| 2006/0051458 | A1 | 3/2006 | Fornaguera | |
| 2006/0051476 | A1 * | 3/2006 | Fornaguera | A23G 3/203 426/516 |
| 2015/0211206 | A1 * | 7/2015 | Otto | E02F 3/3654 173/184 |

FOREIGN PATENT DOCUMENTS

GB 880 735 10/1961
WO 2009/130186 A2 10/2009

OTHER PUBLICATIONS

International Search Report Corresponding to PCT/EP2015/058562 dated Jul. 20, 2015.
Written Opinion Corresponding to PCT/EP2015/058562 dated Jul. 20, 2015.

* cited by examiner

DEPOSITING MACHINE HAVING A PLUG-IN CONNECTION

The invention relates to a depositing machine having a removable component, to a method for inserting a component into a machine frame of a depositing machine, to a method for removing a component from a machine frame of a depositing machine, and to a construction kit for converting a depositing machine.

The depositing machine serves for depositing a free-flowing foodstuff mass, in particular a fatty mass, preferably a mass having suspended solid particles, such as a chocolate mass.

Depositing machines of the generic type are known in the prior art and will be briefly explained hereunder in terms of the functioning thereof.

Depositing machines of this type typically comprise a tank for receiving the free-flowing mass, and a depositing assembly which is most often disposed below the tank. The tank and the depositing assembly are typically disposed on or within a machine frame to which motors and drive means for operating the depositing machine are attached. The tank serves as a mass container. Said tank may have a stirring unit which comprises a horizontally or vertically aligned shaft. A screw conveyor having a vertically or horizontally aligned shaft, and/or a pump device, by means of which the mass to be deposited is moved to the depositing assembly may also be provided. The tank may be impingeable by pressure, for example if and when the former is used for producing aerated chocolate. The tank is typically temperature controllable. The depositing assembly typically comprises pumping means and/or metering means by way of which portions of the mass are delivered from the depositing machine. Said portions are delivered to a receptacle device located below the depositing machine, for example to molds which are conveyed to the depositing machine and away therefrom on a belt. The pumping and/or metering means may be a horizontal pair of gear wheels, vertically aligned metering pistons, horizontally aligned rotary-valve pistons, or a combination of preferably horizontal pump pistons and rotary valves. Most often, the depositing machines include nozzle plates having a multiplicity of nozzles which may be closed off by flexible nozzle flaps, by a blade-type mouth piece, or by a closure slide. The latter are attached to a closure plate which is disposed below the nozzle plate, for example. The machine frame may be fixedly attached in relation to further component parts of a depositing plant, or may itself be movably mounted such that, for example, the depositing machine may be conjointly moved with the molds along a specific distance, or that the entire depositing machine together with all motors and drives may be moveable from an operating position to a maintenance position.

The components of the depositing machine, including the tank, the depositing assembly, the nozzle plate, the closure plate, or modules comprising combinations thereof, have to be cleaned from time to time or replaced, depending on the use of the depositing machine. This may become necessary in the case of a product changeover, a mold changeover, a maintenance operation, or a repair. For this purpose, individual components may be removed from the frame of the depositing machine or be replaced in a mutually independent manner, as is shown for example in WO 2009/130186 A2. The installation, removal, or modification of the depositing-machine components is tedious, time-consuming, and costly. In order for the modification, a cleaning operation, and/or a maintenance operation to be simplified, entire modules may also be simultaneously removed from a frame of the depositing machine, as is likewise shown in WO 2009/130186 A2, for example.

A further depositing machine in which the tank and the depositing assembly form one module which is removable in one piece from the machine frame is known from publication EP 2 353 401 A1. The module has a dedicated frame having two mutually opposite lateral appendages which sit in fixed positions on respective surfaces of arms of the machine frame. The surfaces on which the lateral appendages of the module sit are upper surfaces. While, on the one hand, upper surfaces are readily accessible for the purpose of fitting, they also, on the other hand form exposed faces which are subject to easy contamination when the module is not sitting on the face.

Stable positioning of the module according to EP 2 353 401 A1 is achieved when the appendages of the module that form the bearing faces on the upper surfaces of the arms are not too distant from the center of gravity, that is to say are disposed so as to be approximately centric to a vertical diameter of the module. This leads to the tank being disposed above the arms. Bearing on upper surfaces thus has the disadvantage that either the tank protrudes above the depositing-machine frame, impeding accessibility, or the arms are disposed sufficiently deep down on a rear frame plate in order for the module to be disposed substantially within the frame, this however potentially impeding the general stability of the frame.

Alternatively, the module according to EP 2 353 401 A1 may be provided with a stable frame, the latter repositioning the bearing point toward the top. However, such a frame requires space and increases the weight of the module.

In order for a more central disposal of the appendages of the module to be enabled in the vertical direction and for the center of gravity of the module to be better aligned in the machine frame, a solution in which prism rails which are inwardly and downwardly offset on the arms are provided as bearing elements is known in practice. Said prism rails are better protected from potential contamination and impacts, because the former are disposed within the machine frame, and they offer a lower bearing point which leads to a more stable mounting of the module.

However, the module being held by means of a bearing of appendages on surfaces does have the disadvantage that fixing of the fixed position has to be performed by a vertical lock, for example by vertically aligned positioning pins, or by screw assemblies that have to be vertically introduced. These fastening means are typically difficult to access and require access to the machine frame from yet another direction. The machine frame not only has to be open toward a push-fit direction from which the module is introduced into the machine frame, but also from a direction that permits access to the vertical fixing means.

There thus exists the object of providing a depositing machine and a method for converting a depositing machine, by way of which the disadvantages of the prior art are overcome, by way of which simple operability, readily manageable fixing, and moreover a precise and solid connection between the components of the depositing machine and the depositing-machine frame are enabled.

The object is achieved by a depositing machine as claimed in claim 1. The depositing machine comprises at least one tank which contains a product for depositing and which is equipped with a stirring device for stirring the product in said tank. The depositing machine has a depositing assembly which is located below the tank. The depositing assembly comprises at least one row of horizontal pistons which perform an intake cycle, so as to draw product from the tank, and an exhaust cycle, so as to expel the acquired product. The depositing assembly moreover comprises at least one dispensing device which rotates between a first position, so as to receive the product that has been acquired by the pistons, and a second position which enables an outflow of the product that is expelled by the pistons. The depositing assembly preferably comprises a multiplicity of nozzles.

The depositing machine has a motor for rotating the dispensing device, and actuation means for moving the pistons in a reciprocal manner, wherein the actuation means are releasably connected to the pistons.

The depositing machine has a machine frame which carries the motor and comprises two arms which project along respective parallel horizontal axes and are equipped with the actuation means.

The frame in the case of an alignment of the depositing machine that is as per the intended use may be designed so as to be horizontally encircling or may be designed in a U-shape, being open toward one side. The arms are parts of the frame that lie so as to be opposite one another, the module in a fitted state being disposed therebetween.

It is provided in particular that the module is movable in the frame, between the arms, along an axis that runs substantially parallel to the axes of the arms.

The tank and the depositing assembly form part of a module which is removable in one piece from the frame. The module herein is releasably connected to the motor.

In order for the module to be formed, the tank and the depositing assembly may form a constructive unit and/or be mutually connected in a releasable manner.

The module is equipped with a further frame.

The further frame may be integrally connected to the tank or to the depositing assembly, or a separate frame to which the tank and/or the depositing assembly are fastened is provided. The further frame may completely encompass the tank and/or the depositing assembly, or be open toward one side.

According to the invention, the further frame in the machine frame is fastened, in particular fastened only, by way of a form-fitting plug-in connection, in particular a bolt connection, which is disposed in a substantially horizontal manner.

No bearing rail or bearing plate is required for holding and/or fixing.

In particular, the plug-in connection is aligned along an axis which runs substantially parallel with the axes of the arms of the frame, along which axes the module is preferably movable in the frame.

The object is moreover achieved by a depositing machine as claimed in claim 2, in particular by a depositing machine as has been described above.

The depositing machine for depositing a foodstuff mass, in particular a fatty mass, has a machine frame, a depositing assembly, preferably disposed below a tank, for delivering the foodstuff mass from the depositing machine, and at least one tank for supplying the foodstuff mass to the depositing assembly. The depositing assembly preferably comprises a multiplicity of nozzles.

The tank may be a mass container for the intermediate storing of the foodstuff mass, or be a supply line having distributors by way of which the mass is guided from a remote mass container, and/or from a mass container disposed outside the depositing machine, to the depositing assembly.

At least one component of the depositing machine, in particular the tank, the depositing assembly, and/or a module comprising a tank and a depositing assembly, is/are removable from the machine frame. In particular, the component is also simultaneously removable from a motor and/or from an actuation means.

According to the invention at least one component is fastened to the machine frame by way of a plug-in connection, in particular a bolt connection, which is disposed in a substantially horizontal manner.

In particular, fastening and mounting of the component in the fitted state in the machine frame is achieved only by way of the plug-in connection and not supported by way of bearing on an, in particular upper, bearing face and/or a bearing rail.

In the context of the invention, an operative connection between a projecting member and a corresponding clearance is referred to as a plug-in connection, wherein the projecting part is guidable into the clearance along an axis, and wherein the clearance at least in portions completely surrounds the projecting member in the fitted state such that a form-fit results. If and when the depositing frame and the component have the alignment thereof as per the intended use, the axis is disposed in particular in a substantially horizontal manner, that is to say that the axis is not vertically aligned and lies on the horizontal, or, with the horizontal, encloses a minor angle, in any case an angle of less than 90°, in particular of less than 45°.

The projecting member may be one or a plurality of pin-type, dowel-type, or strip-type elements. The corresponding clearance substantially has a geometry that complements the shape of the projecting member.

The plug-in connection according to the invention ensures an easily establishable and durable connection between the component and the depositing-machine frame.

In particular, the plug-in connection is aligned along an axis which runs substantially parallel with the axes of the arms of the frame, along which axes the module is preferably movable in the frame.

As opposed to a planar bearing in the case of which two-dimensional displacement is possible in principle without any additional guides, in the case of a plug-in connection a specific direction is defined by the surrounding encapsulation of the projecting member in the corresponding clearance, and any movement in other directions does not have to be precluded by way of additional securing.

Moreover, the plug-in connection predefines an unequivocal push-fit direction such that positioning of the component is very precise.

The plug-in connection may be established by way of a screw and a screw hole; however, the projecting member is preferably moved to the terminal position in the clearance without rotation.

Therefore, the plug-in connection is preferably embodied as a bolt connection, wherein the plug-in connection comprises at least one bolt hole, in particular a blind hole or a through hole, on the one hand, and at least one bolt which in the fitted state is disposed in the latter, on the other hand.

The bolt connection is preferably configured by at least one bolt which is disposed on the component, and/or at least one bolt hole which is disposed on the component, on the one hand, and at least one bolt hole which is disposed on the machine frame, and/or at least one bolt which is disposed on the machine frame, on the other hand. The bolt and the bolt hole herein are disposed such that they interact, in particular form a form-fit, in the fitted state and hold the component in the machine frame.

In particular, the component within the machine frame is movable, wherein bolt and bolt hole serve for centering and thus for precise positioning of the component in the machine frame of the depositing machine.

Moving the component may be performed by way of a displacement, wherein the component either bears on an external carrier device, on a member that is attached to the machine frame, or said component has a rack connected thereto.

Preferably, at least one bolt of the bolt connection is embodied as a centering bolt such that particularly a bolt and an associated bolt hole are axially tapered, furthermore particularly are configured so as to be cylindrical or conical.

The bolt and the associated bolt hole preferably have a cylindrical geometry. A polygonal cross-sectional area of the bolt and of the associated bolt hole may also be provided, or fitting grooves, rail-type elevations, or introduction ramps are provided on the projecting member.

The centering bolt leads to the component not yet having to be accurately positioned in relation to the machine frame even shortly prior to the establishment of the bolt connection. The component is moved by way of the centering to the accurate position in relation to the machine frame, for example to the correct height, only upon establishment of the bolt connection.

The plug-in connection preferably comprises at least two bolts of identical axial alignment, that is to say that the axes run in parallel and the free ends point in the same direction. The component may thus be precisely horizontally and/or vertically aligned, and in the fitted state is secured in relation to oscillations. Preferably a plurality, in particular four, bolts which in a horizontal plane are uniformly distributed, that is to say with two bolts at the front, two bolts at the rear, and two bolts to the right and to the left, around the component are provided.

The plug-in connection may be embodied such that said connection is lockable. To this end, the projecting member may be embodied so as to be rotatable, for example, have an external thread by way of which a screw connection is establishable, or have latching cams by way of which a bayonet closure is establishable.

The projecting member is preferably fixedly fitted.

In one advantageous embodiment of the invention, a bolt of a bolt connection has an opening for a fastening element.

The bolt may be secured by a cotter pin. Preferably, however, a bolt and a corresponding bolt hole each are provided with one axial threaded bore such that in particular the complete configuration of a form-fit is achievable by way of a screw assembly which is guided longitudinally through a bolt.

This fixing has the advantage that it is performed along the same direction as the push-fit of the component. The screw connection may thus be released or fixed from the same side from which push-fitting of the component is performed.

In one advantageous embodiment of the invention, a bolt of the bolt connection has axially or radially displaceable elements, or elements of a variable radial extent, for radially pressing the bolt in a bolt hole. The displaceable or variable elements may for example first be moved to the terminal position thereof, if and when a part of the bolt that may have a smaller diameter than the bolt hole has already been introduced into the bolt hole, and may then establish a form-fitting or force-fitting connection. The bolt then is very easily guidable into the bolt hole, and initially serves for positioning the component, fixing and mounting being established only in a second step.

A conically shaped element which is mounted so as to be axially displaceable on a bolt axis may be provided as an axially displaceable element, for example.

Cotter pins which upon introduction of a bolt axis into a bolt hole are sunk into grooves of the bolt axis, are resiliently mounted there and exit from the grooves only once the bolt axis has reached the terminal position thereof may be provided as radially displaceable elements.

In one preferred embodiment of the invention, the depositing machine comprises at least one motor and actuation means for actuating the depositing assembly, wherein the motor and the actuation means are disposed on the machine frame, wherein the tank and/or the depositing assembly individually, or the tank and the depositing assembly as a module in one piece is/sire removable from the motor and the actuation means.

The typically heavy drive technology may thus remain on the machine frame for cleaning and maintenance purposes and need not be removed conjointly with the components.

The plug-in connection is universally employable and may be used for depositing assemblies having any type of depositing mechanism. For example, the depositing assembly may have at least one, in particular rotatable, dispensing device, and at least one, in particular horizontally disposed, pump piston; said depositing assembly may nave at least one, in particular rotatable and axially displaceable, metering-pump cylinder which is preferably disposed in a horizontal manner. Said depositing assembly may also comprise at least one vertically disposed pump cylinder or at least one rotating pair of gear wheels.

Moreover, at least one valve plate may be associated with the depositing assembly. The depositing assembly may also have one or a plurality of nozzle plates by way of which variable depositing patterns may be produced.

Moreover, the depositing assembly may have a closure plate on which blades or slides, by way of which the nozzles are closed or the exiting let of mass is cut off, so as to prevent post-dripping, are provided.

Moreover, the depositing assembly may be composed of depositing-assembly modules which may be variably assembled to form depositing assemblies each having different depositing patterns and/or different conveying rates.

In one advantageous embodiment of the invention, the tank has at least one stirring device which in particular is releasably connectable to a stirring-unit motor which is disposed on the machine frame.

In the case of the tank being removed, the actuation means for the stirring device may remain on the machine frame.

The stirring device may be equipped with a horizontally disposed or a vertically disposed shaft.

The tank may have a plurality of stirring devices and moreover be sub-dividable into compartments such that dissimilar masses may be held in one tank and be brought together only during depositing, so as to produced filled, layered, patterned, and/or marbled foodstuffs.

In one preferred embodiment of the invention, the machine frame comprises a rear plate on which the at least one bolt and/or the at least one bolt hole, and in particular also couplings for connecting at least one motor, in particular the motor for driving the depositing assembly or else the motor for driving a stirring device, are provided. Alternatively, the couplings may be disposed on a rack of the machine frame. However, a plate, together with a stable and defined mounting, also establishes a hygienically advantageous separation between machine parts which (for example the motors) require lubrication and such parts which come into contact with the foodstuff mass.

Further actuation means which transmit a force from a motor to the depositing assembly, in particular to horizontally disposed pistons, may be provided on the machine frame, for example in the region of the arms. Said further actuation means may be gear racks, timing belts, or eccentrics, for example. These actuation means preferably are also releasably connectable to the depositing assembly and upon removal of the depositing assembly from the machine frame may remain on the machine frame.

The component is held in a very stable manner by bolts and/or the bolt hole disposed on the rear plate.

Alternatively, bolt and/or bolt hole may be disposed on a rack of the machine frame, for example may be attached to the arms by way of carrier elements.

Members which protrude into a region within the frame and have projecting elements and/or clearances for a plug-in connection, in particular bolts and/or bolt holes for a bolt connection, are preferably disposed in a region of the machine frame that is remote from the rear wall.

The component may then not only be held on the rear part of the frame. Projecting elements and/or clearances for a plug-in connection are preferably disposed such that a uniform distribution of the weight load of the components is enabled, for example having two bolt holes on the rear wall and two bolts in the front region of the machine frame. All bolts and bolt holes preferably are of identical axial alignment.

Additionally, guides, in particular rollers, on which the at least one component, in particular the tank and/or the depositing assembly individually, or the tank and the depositing assembly as a module in one piece, is/are guidable, may be attached to the machine frame, wherein at least one projecting element and one corresponding clearance, in particular a bolt and a corresponding bolt hole, are convergeable.

The guides are configured in such a manner that the component upon complete establishment of the plug-in connection, in particular in the case of a complete form-fit, does not bear on the guide. The component in the fitted state is not held by the guides but by the plug-in connection.

Therefore, the guides do not have to be conceived such that said guides absorb the forces which act on the component when the depositing machine is in operation. Moreover, the guides do not have to be conceived such that a precise terminal position of the component is guaranteed. Rather, the guides serve only to transfer the component from a carrier device, for example a carriage, and to temporarily hold said component until the plug-in connection is established. The guides may be designed such that preliminary centering of the component takes place such that corresponding projecting elements and clearances of the plug-in connection are guided toward one another when the component is push-fitted.

The object is moreover achieved by a method for inserting a module into a depositing machine as has been described above, wherein the method comprises the following steps.

A module is offered up in front of the machine frame in such a manner that the module is located in the front region between the arms of the machine frame.

Thereafter, introduction of the module into the region between the arms is performed in such a manner that a substantially horizontal plug-in connection, in particular a bolt connection, is configured between the machine frame and the further frame.

Moreover, the motor is linked to the dispensing device, and the pistons are linked to the actuation means.

The object is moreover achieved by a method for inserting a tank and/or a depositing assembly, or a module comprising a tank and a depositing assembly, into a machine frame of a depositing machine, in particular a depositing machine as has been described above, in particular a method for inserting a module as has been described above, wherein the method comprises the following steps.

At least one component, in particular a tank, a metering device, and/or a module comprising a tank and a depositing assembly, is introduced into the machine frame, wherein at least one projecting element and one corresponding clearance, in particular one bolt and at least one corresponding bolt hole, each being attached to the component, on the one hand, and to the machine frame, on the other hand, are mutually converged.

A substantially horizontal plug-in connection, in particular a form-fit between bolt and bolt hole, is established.

The plug-in connection may be locked by an additional fixing measure, for example by a screw assembly.

The component is preferably push-fitted into the frame; herein the component may be guided on guides, in particular a roller track, between arms of the machine frame, said guides or roller track being fixedly fitted to the machine frame.

The component, upon configuration of the plug-in connection, in particular upon configuration of a form-fit of the bolt connection, is advantageously raised from the guide, in particular from the roller track, such that the component in the fitted state is held only by the plug-in connection, in particular.

The object is moreover achieved by a method for removing a module from a depositing machine as has been described above, wherein the method comprises the following steps.

The piston is separated from the actuation means, and the motor is separated from the dispensing device.

The module is retrieved from the region between the arms in such a manner that a substantially horizontal plug-in connection, in particular a bolt connection, between the machine frame and the further frame is released.

The object is moreover achieved by a method for removing at least one component, in particular a tank, a depositing assembly, and/or a module comprising a tank and a depositing assembly, from a machine frame of a depositing machine, in particular a depositing machine as has been described above, in particular a method for removing a module as has been described above, wherein the method comprises the following steps.

First, the releasing of a substantially horizontal plug-in connection, in particular the releasing of a form-fit between at least one bolt and at least one bolt hole, each being disposed on the component, on the one hand, and on the machine frame, on the other hand, is performed. This is performed in particular by mutual axial displacement, in particular in a substantially horizontal direction.

The component is displaced in relation to the machine frame, wherein a projecting member and a corresponding clearance, in particular a bolt and a bolt hole, are removed from one another.

Removing of the component comprises at least one of the following further steps: separating the depositing assembly from actuation means and/or from a motor, separating a stirring device from a motor, lowering the component onto a guide, in particular a roller track; horizontally displacing the component on a guide, in particular a roller track; transferring the component by way of a carrier device.

The object is moreover achieved by a construction kit for converting a depositing machine having a machine frame, a depositing assembly, preferably disposed below a tank, for delivering the foodstuff mass from the depositing machine, at least one tank for supplying the foodstuff mass to the depositing assembly, wherein the tank, the depositing assembly, and/or a module comprising a tank and a depositing assembly, is/are removable from the machine frame.

The construction kit for the conversion comprises at least one first carrier part which is fastenable to one of the components, in particular to the tank, the depositing assembly, and/or the module, and at least one second carrier part which is fastenable to the machine frame.

At least one projecting member and/or at least one clearance, in particular a bolt and/or a bolt hole, is/are disposed on each of the first carrier part and the second carrier part. A plug-in connection, in particular a form-fitting belt connection, is establishable between the first and the second carrier part.

The carrier parts are preferably fastenable to the component and to the machine frame such that a horizontal plug-in connection is establishable.

Figure 1:
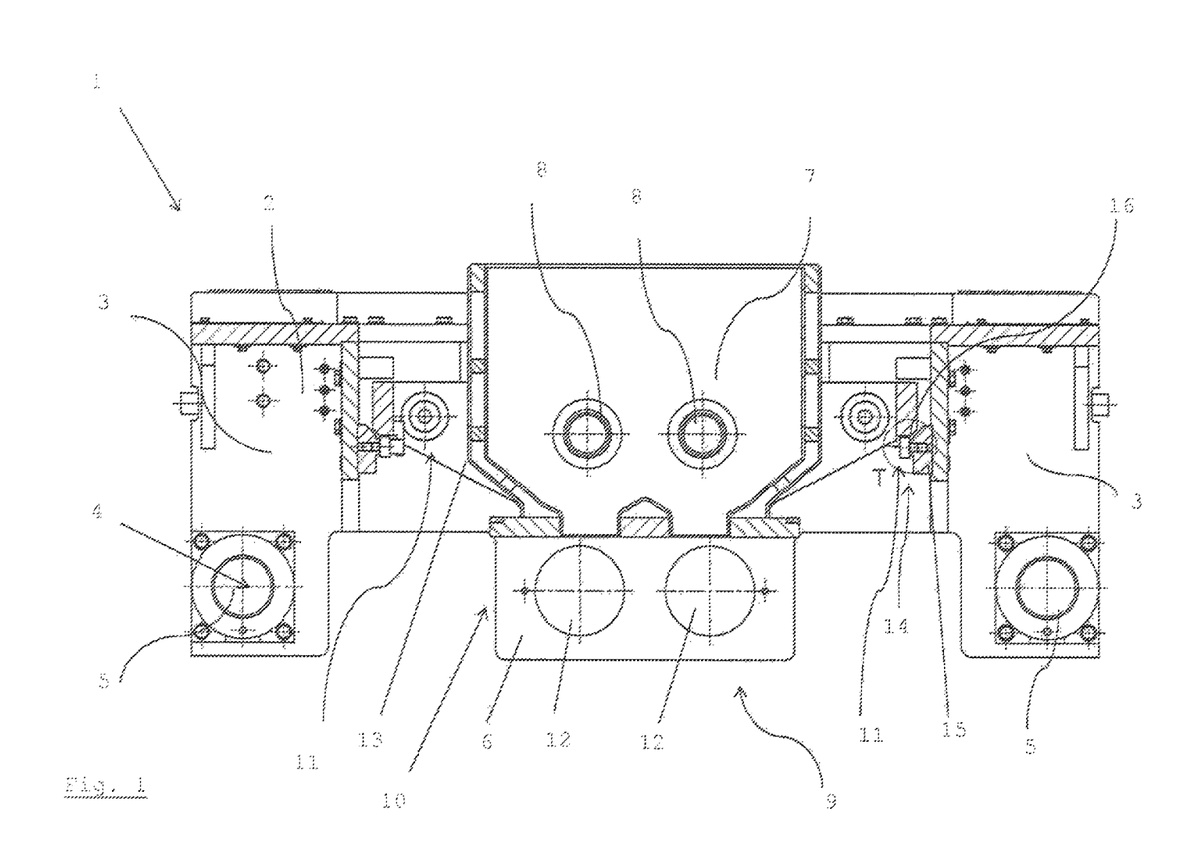
FIG. 1 shows a depositing machine according to the invention in the fitted state in a schematic sectional illustration transverse to the push-fit direction.

The invention is explained hereunder by way of exemplary embodiments by means of the drawings in which:

FIG. 1 shows a depositing machine 1 in the fitted state in a schematic sectional illustration.

The depositing machine 1 has a machine frame 2 which carries at least one motor (not explicitly shown) and comprises two arms 3 which project along respective parallel horizontal axes 4 and are equipped with actuation means 5.

The depositing machine 1 has a depositing assembly 6 for delivering the foodstuff mass from the depositing machine 1, said depositing assembly 6 preferably being disposed below a tank 7.

The tank 7 is equipped with a stirring device 8.

In the present exemplary embodiment, the tank 7 and the depositing assembly 6 form part of a module 9 which as a component 10 of the depositing machine 1 is removable in one piece from the frame 2.

The component 10 is fastened to the machine frame 2 by means of a plug-in connection 11 which is disposed in a substantially horizontal manner.

The module 9 is equipped with a further frame 13 which in the present example is fastened to the machine frame 2 by way of a form-fitting bolt connection.

The depositing assembly 6, on both sides facing the arms 3, comprises a row of horizontal pistons (not explicitly illustrated) which perform an intake cycle, so as to draw product from the tank, and an exhaust cycle, so as to expel the acquired product. The depositing assembly 6 on each side moreover comprises one dispensing device 12 which rotates between a first position, so as to receive the product that has been acquired by the pistons, and a second position, which enables an outflow of the product that is expelled by the pistons.

The depositing assembly 6 is releasably connected to a motor, attached to the machine frame 2, for rotating the dispensing device 12. The actuation means for moving the pistons are likewise releasably connected to the pistons.

Guides 14, in the present case strips 15 having rollers 16, are attached to the machine frame 2.

Figure 2:
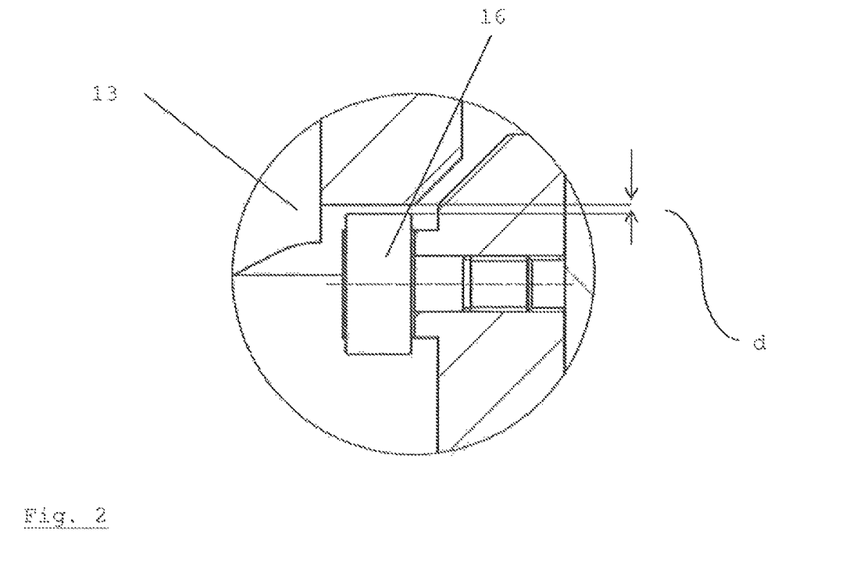
FIG. 2 shows a detailed view of fragment T of FIG. 1.

It can be seen in FIG. 2 that the component 10 in the fitted state, that is to say upon complete establishment of the plug-in connection 11, does not bear on the guide 14, but that there is a spacing d between the frame 13 of the module 9 and the rollers 16.

Thus, the rollers 16 do not have to carry the module 9 during operation.

Introducing the module 9 into the machine frame 2 is shown by means of the following pictures.

In a first step, the module 9 is positioned in front of the machine frame in such a manner that the module 9 is located in the front region between the arms 3 of the machine frame 2. The module 9 may then be guided into the region between the arms 3. Positioning may be performed by way of a carrier device (not explicitly shown), for example a lifting truck.

Figure 3:
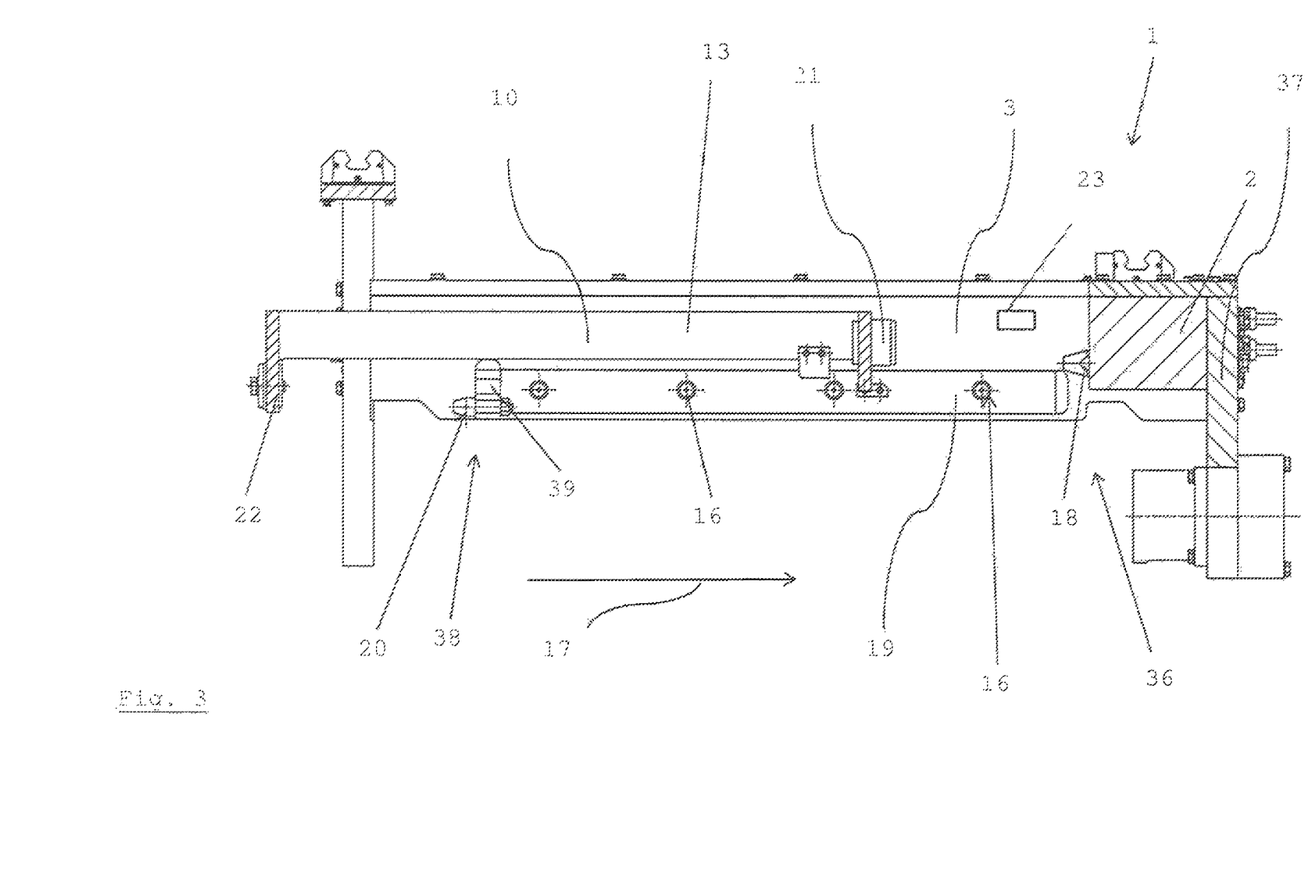
FIG. 3 shows the depositing machine according to the invention, having the component in a first position, in a schematic sectional illustration along the push-fit direction.

FIG. 3 shows the depositing machine 1 according to the invention in a schematic sectional illustration along the push-fit direction 17, wherein the component 10 is located in a first position between the arms 3 of the machine frame 2.

Bolts 18 as projecting elements 28 for a plug-in connection 11 are attached to the machine frame 2 in the rear region 36. The bolts 18 are configured as conically shaped centering bolts.

The machine frame 2 comprises a rear plate 37 on which bolts 18 are provided. Moreover, couplings (not explicitly shown) for connecting at least one motor are provided on the rear plate 37.

Members 39 which protrude into the frame 2 and likewise have bolts 20 are disposed in a region 38 of the machine frame 2 that is remote from the rear plate 37.

Roller tracks 19 having rollers 16 are provided on the arms 3, bolts 20 being likewise disposed on the front end of said roller tracks.

Corresponding rear bolt holes 21 and front bolt holes 22, as clearances 29, for a plug-in connection are disposed on the frame 13 of the module 9.

The component 10 may be push-fitted into the frame up to a stop 23 which is provided on the machine frame, is then lowered onto the roller track 19, and is pushed farther on the rollers 16 in the push-fit direction 17 such that bolts 18, 20 and corresponding bolt holes 21, 22 converge.

Figure 4:
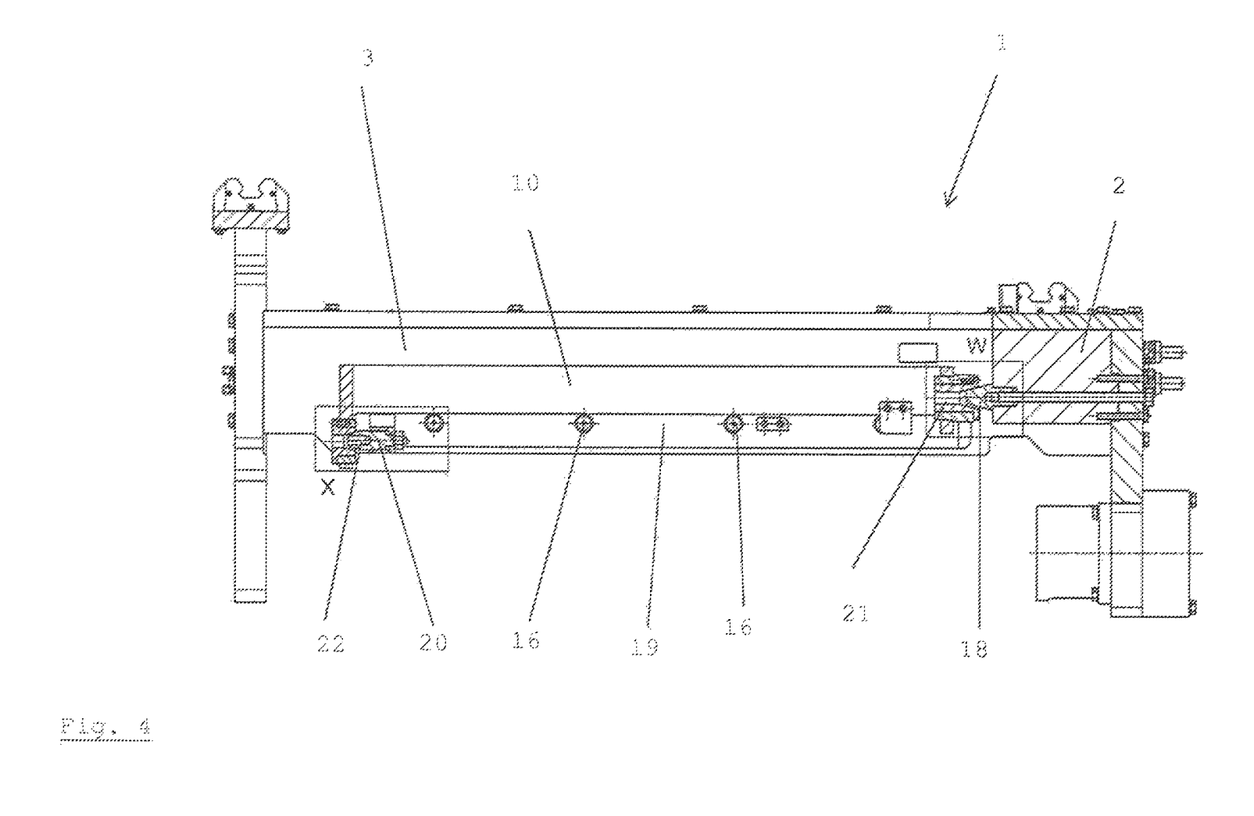
FIG. 4 shows the depositing machine according to the invention, having the component in a second position, in a schematic sectional illustration along the push-fit direction.

FIG. 4 shows the depositing machine 1 according to the invention in a schematic sectional illustration along the push-fit direction 17, wherein the component 10 is located in a second position between the arms 3 of the machine frame 2, wherein bolts 18, 20 and corresponding bolt holes 21, 22 have been brought into mutual contact but no form-fitting connection has yet been established.

The module 9 still bears on the rollers 16 of the roller track 19.

Figure 6:
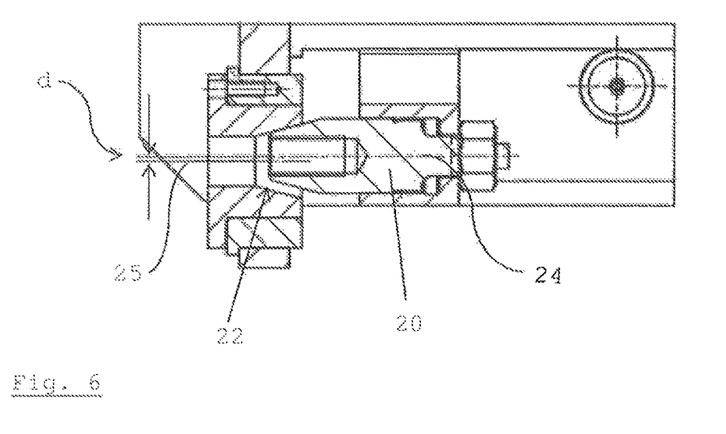
FIG. 6 shows a detailed view of fragment X of FIG. 4.
Figure 7:
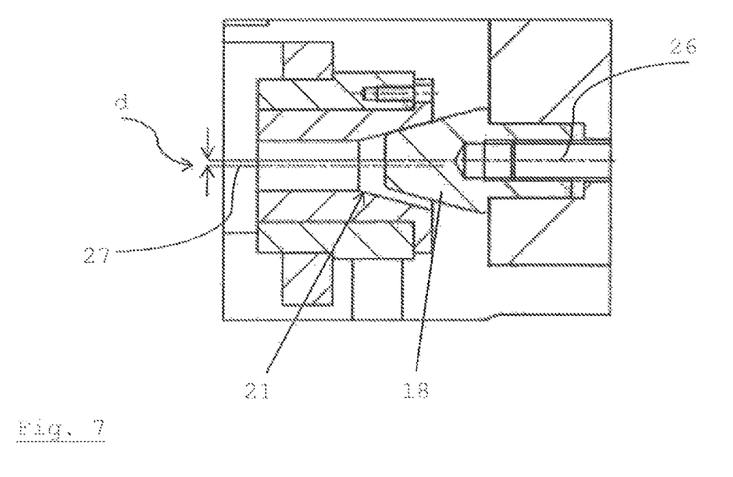
FIG. 7 shows a detailed view of fragment W of FIG. 4.

It can be seen from FIGS. 6 and 7 that there is a spacing d between the axis 24 of the front centering bolt 20 and the axis 25 of the front bolt hole 22, as well as between the axis 26 of the rear bolt 18 and the axis 27 of the rear bolt hole 21.

Figure 5:
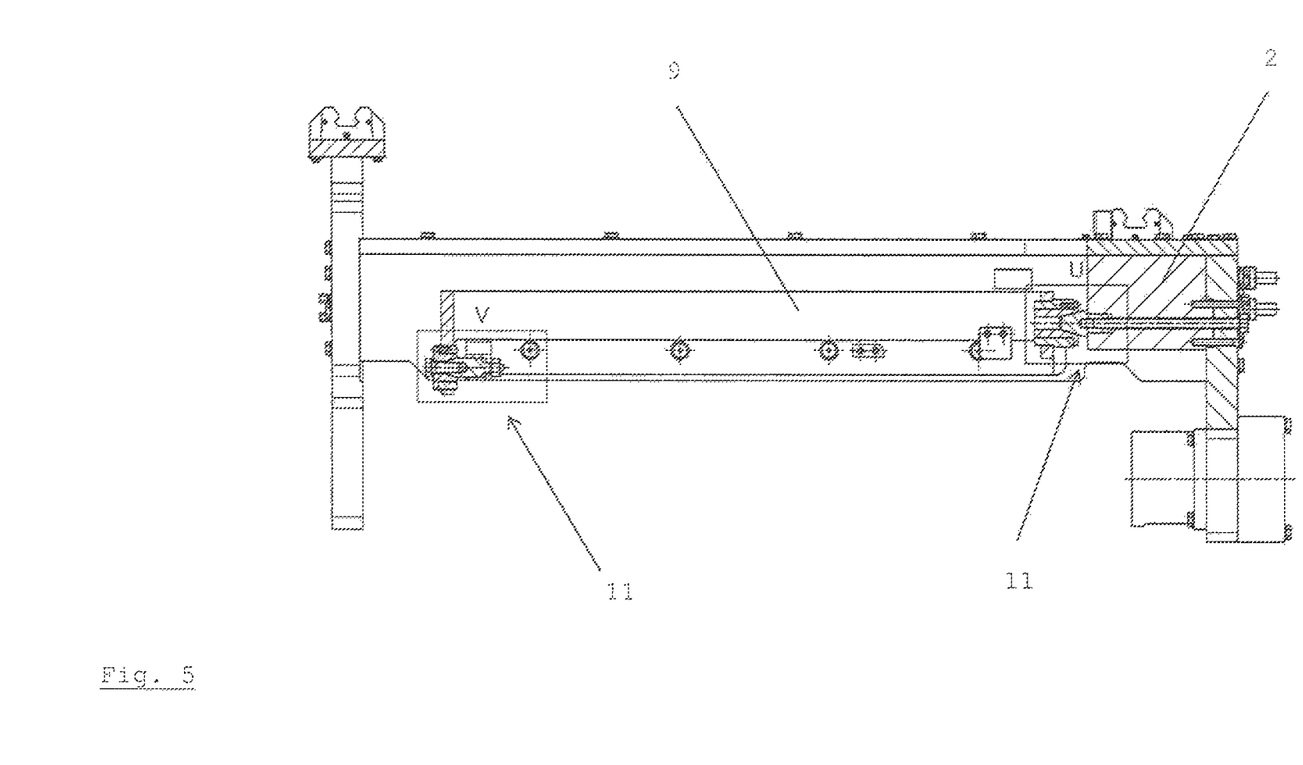
FIG. 5 shows the depositing machine according to the invention, having the component in a third position, in a schematic sectional illustration along the push-fit direction.

The bolts 18, 20 are embodied so as to be conical such that upon further pushing of the module 9 in the push-fitting direction, the module 9 is inevitably drawn into the terminal position thereof, the latter being illustrated in FIG. 5.

In the third position illustrated in FIG. 3, a substantially horizontal plug-in connection 11 has been configured between the machine frame 2 and the frame 13 of the module 9, wherein a form-fit between in each case one bolt 18, 20 and a corresponding bolt hole 21, 22 has been established.

Figure 8:
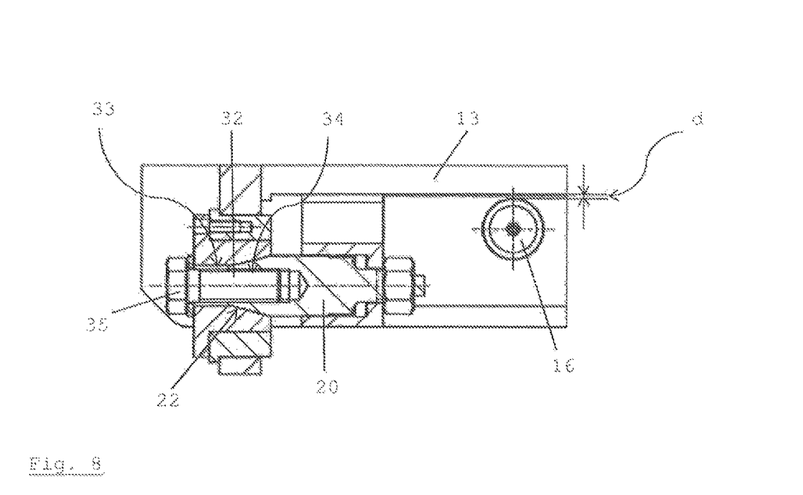
FIG. 8 shows a detailed view of fragment V of FIG. 5.

It can be seen in FIG. 8 that the frame 13 of the module 9 is spaced apart from the rollers 16 by a spacing d.

The rear bolt holes 21 are embodied as a blind hole 30.

Figure 9:
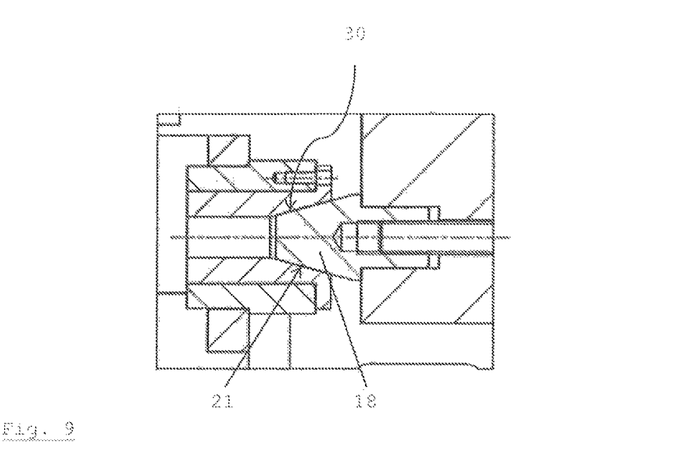
FIG. 9 shows a detailed view of fragment U of FIG. 5.

The front bolt holes 22 have an opening 31 for a fastening element 32. In the present case, the front bolts 20 and the corresponding bolt holes 22 each are provided with axial threaded bores 33, 34 such that the complete configuration of the form-fit is achieved by fixing a screw 35 which is guided longitudinally through the bolts 20.

Now the pistons are yet to be linked to the actuation means, and the motor is yet to be linked to the dispensing device.

The following pictures show examples of various metering mechanisms, wherein components or a module are fastenable to a machine frame by way of a plug-in connection.

Figure 10:
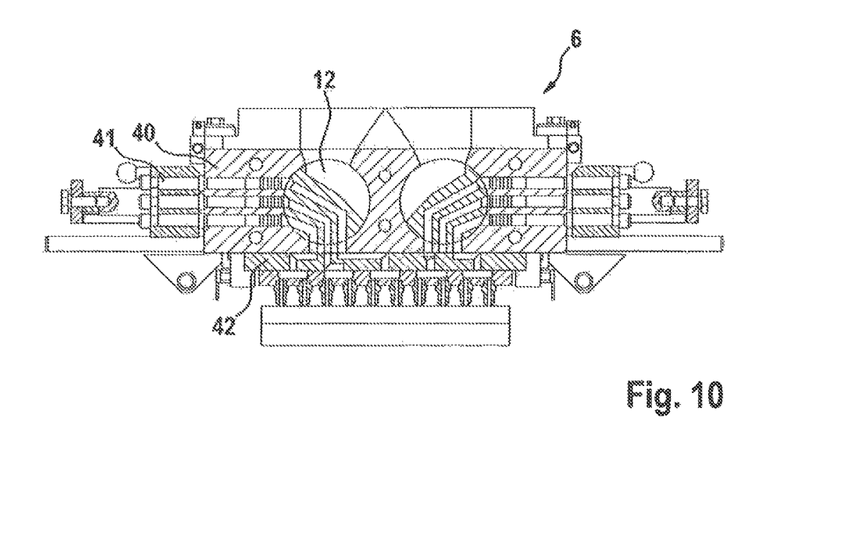
FIG. 10 shows a first example of a depositing assembly in a schematic sectional illustration.

FIG. 10 shows a depositing assembly 6 having a double-sided piston system. Rotatable dispensing devices 12, on the one hand, and horizontal pistons 41, on the other hand, are disposed in a piston block 40. The pistons 41, preferably at the end side, are connected to a piston plate such that the pistons may be collectively moved in a reciprocal manner, for example by a gear rack or an eccentric. For removal, the piston plate has to be separated from the drive means, and the dispensing device has to be separated from the motor.

A nozzle plate 42 is provided below the depositing assembly 6.

Figure 11:
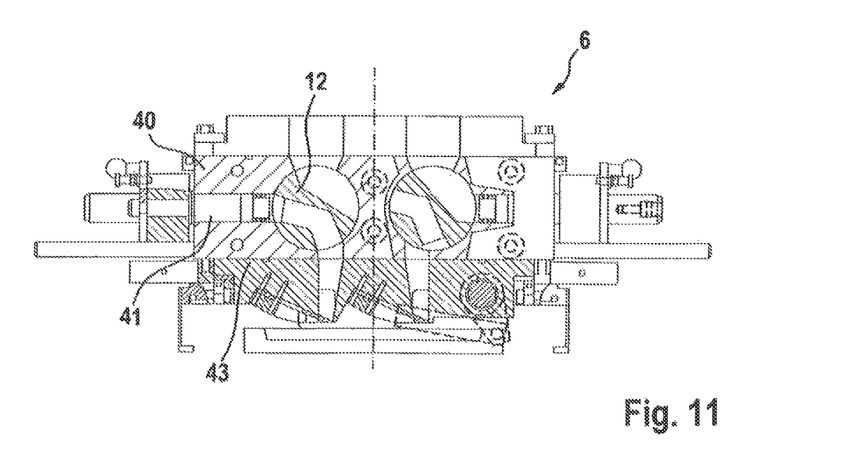
FIG. 11 shows a second example of a depositing assembly in a schematic sectional illustration.

FIG. 11 likewise shows a depositing assembly 6 having a piston block 40 in which rotatable dispensing devices 12 and horizontal pistons 41 are disposed. A blade block 43, by way of which masses that contain lumpy components may be cleanly metered, is disposed below the depositing assembly.

Figure 12:
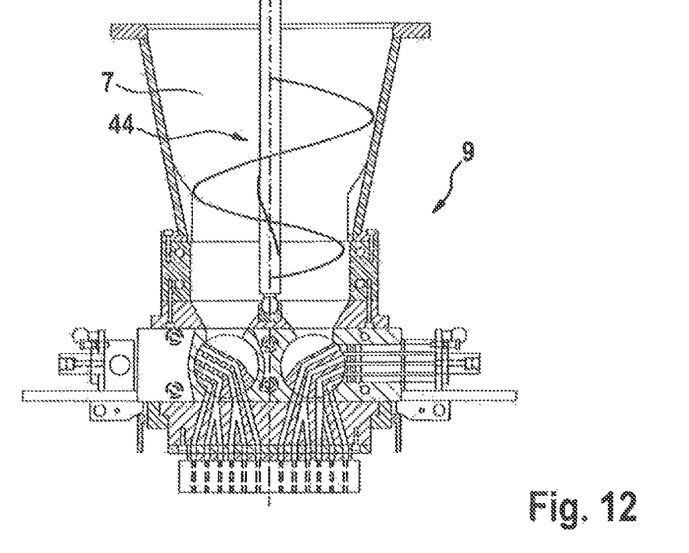
FIG. 12 shows a third example of a module in a schematic sectional illustration.

FIG. 12 shows a module 9 having a tank 7 which is embodied as a conical mass container and on which a vertically aligned stirring device 44 having a screw conveyor is provided. Modules of this type are suitable for conveying viscous masses, for example marzipan masses.

Figure 13:
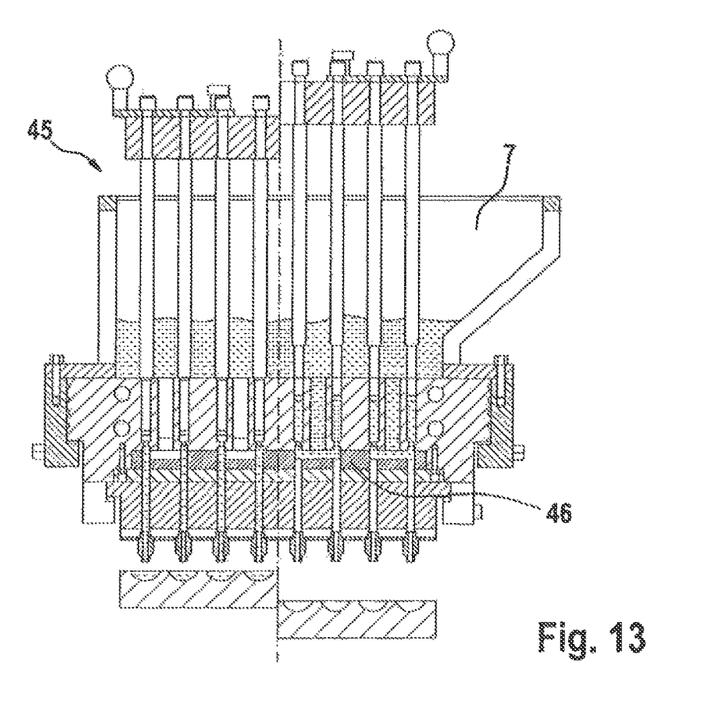
FIG. 13 shows a fourth example of a module in a schematic sectional illustration.

FIG. 13 shows a module 9 having a tank 7 in which vertical metering pistons 45 are disposed. A slide 46 which is moved by a servo motor, for example, may be moved to a metering position (left side) or to an intake position (right side) in which mass does not pass through the nozzles.

Figure 14:
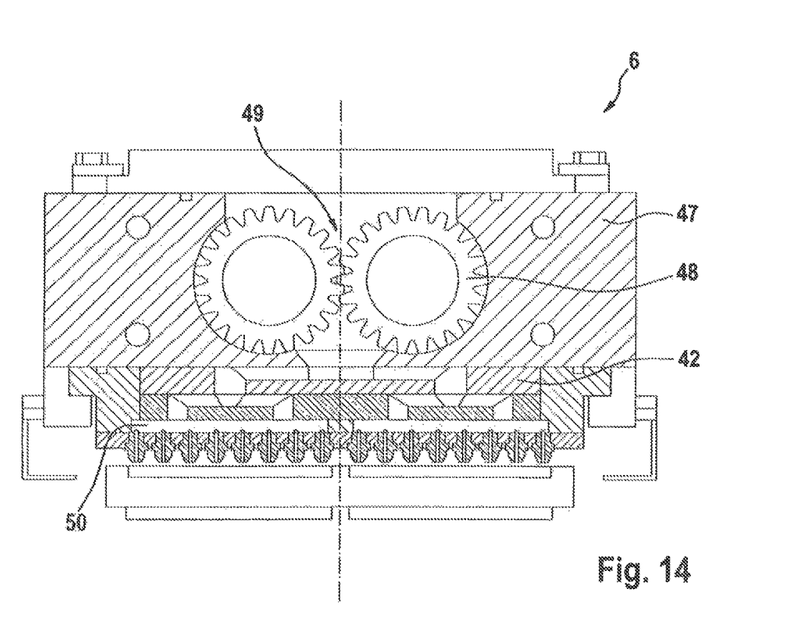
FIG. 14 shows a fifth example of a depositing assembly in a schematic sectional illustration.

FIG. 14 shows a depositing assembly 6 having a metering block 47 in which gear wheels 48 are disposed as a pair of gear wheels 49. A nozzle plate 42 having distributor ducts 50 is disposed below the depositing assembly.

The invention claimed is:

1. A depositing machine having:
   at least one tank which contains a product for depositing and which is equipped with a stirring device for stirring the product in the tank;
   a depositing assembly which is located below the tank and comprises:
   a) at least one row of horizontal pistons which perform:
      an intake cycle which draws product from the tank, and
      an exhaust cycle which expels acquired product; and
   b) at least one dispensing device which rotates between:
      a first position for receiving the product acquired by the pistons, and
      a second position enabling an outflow of the acquired product that is expelled by the pistons;
   a motor for rotating the dispensing device;
   actuation means for moving the pistons in a reciprocal manner, and the actuation means are releasably connected to the pistons; and
   a machine frame which carries the motor and comprises two arms which project along respective parallel horizontal axes and are equipped with the actuation means; and
   the tank and the depositing assembly form part of a module which is removable as one piece from the frame;
   the module is releasably connected to the motor and is equipped with a further frame, and the further frame in the machine frame is fastened, by way of a form-fitting bolt connection, which is disposed in a substantially horizontal manner, wherein the further frame is fastened to the machine frame only by way of the form-fitting bolt connection and no bearing rail or bearing plate is required for holding and/or fixing.

2. A method for inserting a module into a depositing machine as claimed in claim 1, wherein the method comprising:
   offering up a module in front of the machine frame in such a manner that the module is located in a front region between the two arms of the machine frame;
   introducing the module into the region between the two arms in such a manner that a substantially horizontal bolt connection, is configured between the machine frame and the further frame, wherein the further frame is fastened to the machine frame only by way of the form-fitting bolt connection and no bearing rail or bearing plate is required for holding and/or fixing;
   linking the pistons to the actuation means; and
   linking the motor to the dispensing device.

3. A method for removing a module from a depositing machine as claimed in claim 1, the method comprising:
   separating the pistons from the actuation means;
   separating the motor from the dispensing device;
   retrieving the module from a region between the two arms in such a manner that a substantially horizontal bolt connection, between the machine frame and the further frame, is released, wherein the further frame is fastened to the machine frame only by way of the form-fitting bolt connection and no bearing rail or bearing plate is required for holding and/or fixing.

4. A depositing machine for depositing a foodstuff mass comprising:
   a machine frame,
   a depositing assembly for delivering the foodstuff mass from the depositing machine, and at least one tank for supplying the foodstuff mass to the depositing assembly, wherein at least a component of the depositing machine is removable from the machine frame, and the component is fastened to the machine frame by way of a plug-in connection which is disposed in a substantially horizontal manner, wherein fastening and mounting of the component in the fitted state in the machine frame is achieved only by way of the plug-in connection and not supported by way of bearing on a bearing face and/or a bearing rail.

5. The depositing machine as claimed in claim 4, wherein the component is the tank, the depositing assembly, and/or a module comprising a tank and a depositing assembly.

6. The depositing machine as claimed in claim 4, wherein the plug-in connection is a bolt connection.

7. The depositing machine as claimed in claim 4, wherein the plug-in connection comprises at least one bolt hole, on one hand, and at least one bolt which in the fitted state is disposed in the latter, on another hand.

8. The depositing machine as claimed in claim 7, wherein the bolt hole is one of a blind hole or a through hole.

9. The depositing machine as claimed in claim 4, wherein a bolt connection is configured by:
at least one bolt which is disposed on the component, and/or at least one bolt hole which is disposed on the component, on one hand, and
at least one bolt hole which is disposed on the machine frame, and/or at least one bolt which is disposed on the machine frame, on another hand;
the bolt and the bolt hole are disposed such that, in a fitted state, they interact and hold the component in the machine frame.

10. The depositing machine as claimed in claim 6, wherein a bolt of the bolt connection is embodied as a centering bolt.

11. The depositing machine as claimed in claim 10, wherein the bolt and the associated bolt hole are axially tapered.

12. The depositing machine as claimed in claim 4, wherein the plug-in connection comprises at least two bolts which have identical axial alignment.

13. The depositing machine as claimed in claim 6, wherein a bolt of the bolt connection has an opening for a fastening element.

14. The depositing machine as claimed in claim 13, wherein a bolt and a bolt hole each are provided with one axial threaded bore such that a complete configuration of a form-fit is achievable by way of a screw which is guided longitudinally through the bolt.

15. The depositing machine as claimed in claim 6, wherein a bolt of the bolt connection has axially or radially displaceable elements, or elements of a variable radial extent, for radially pressing the bolt in a bolt hole.

16. The depositing machine as claimed in claim 4, wherein the depositing machine comprises at least one motor and actuation means for actuating the depositing assembly, the motor and the actuation means are disposed on the machine frame, the tank and/or the depositing assembly individually, or the tank and the depositing assembly as a module in one piece is/are removable from the motor and the actuation means.

17. The depositing machine as claimed in claim 4, wherein the depositing assembly comprises at least one of the following assemblies:
at least one dispensing device, and at least one pump piston;
at least one metering-pump cylinder;
at least one vertical pump cylinder;
at least one rotating pair of gear wheels; and
at least one nozzle plate.

18. The depositing machine as claimed in claim 4, wherein the tank has at least one stirring device.

19. The depositing machine as claimed in claim 4, wherein the machine frame comprises a rear plate on which the at least one bolt and/or the at least one bolt hole are provided.

20. The depositing machine as claimed in claim 4, wherein members which protrude into the machine frame and have projecting elements and/or clearances for a plug-in connection are disposed in a region of the machine frame that is remote from a rear wall.

21. The depositing machine as claimed in claim 4, wherein guides, on which the at least one component is guidable, are attached to the machine frame, at least one projecting element and one corresponding clearance are convergeable, and the guides are configured in such a manner that the component, upon complete establishment of the plug-in connection, does not bear on the guide.

22. The depositing machine as claimed in claim 21, wherein the guides are rollers.

23. A method for inserting a component into a machine frame of a depositing machine as claimed in claim 4, wherein the method comprising:
introducing at least one component into the machine frame, at least one projecting element and one corresponding clearance, each being attached to the component, on one hand, and to the machine frame, on another hand, are mutually converged;
establishing a substantially horizontal plug-in connection, such that fastening and mounting of the component in the fitted state in the machine frame is achieved only by way of the plug-in connection and not supported by way of bearing on a bearing face and/or a bearing rail.

24. The method as claimed in claim 23, wherein the component is guided, on guides, between two arms of the machine frame.

25. The method as claimed in claim 24, wherein the guide is a roller track.

26. The method as claimed in claim 24, wherein the component, upon configuration of the plug-in connection, is raised from the guide.

27. A method for removing at least one component from a machine frame of a depositing machine as claimed in claim 4, the method comprising:
releasing a substantially horizontal plug-in connection between at least one projecting member and at least one corresponding clearance, each being disposed on the component, on one hand, and on the machine frame, on another hand, by mutual axial displacement in a substantially horizontal direction, and
displacing the component in relation to the machine frame, and the projecting member and the corresponding clearance are removed from one another, wherein fastening and mounting of the component in the fitted state in the machine frame is achieved only by way of the plug-in connection and not supported by way of bearing on a bearing face and/or a bearing rail.

28. The method as claimed in claim 27, the method further comprising at least one of the following:
separating the depositing assembly from actuation means and/or from a motor,
separating a stirring device from a motor,
lowering the component onto a guide, horizontally displacing the component on a guide, and transferring the component by way of a carrier device.

29. The depositing machine as claimed in claim 14, wherein the screw and the bolt are arranged, such that the screw may be released or fixed from the same side from which push-fitting of the component is performed.

30. The depositing machine as claimed in claim 6, wherein four bolts are uniformly distributed around the component, such that two bolts at the front, two bolts at the rear, two bolts to the right and two bolts to the left are provided.

31. A construction kit for converting a depositing machine which comprises a machine frame, a depositing assembly, for delivering the foodstuff mass from the depositing machine, and at least one tank for supplying the foodstuff mass to the depositing assembly, wherein the tank, the depositing assembly, and/or a module comprising a tank and a depositing assembly, being removable from the machine frame, the construction kit for the conversion comprises:
- at least one first carrier part which is fastenable to a component, the depositing assembly, and/or the module; and
- at least one second carrier part which is fastenable to the machine frame,
- at least one projecting member and/or at least one clearance being disposed on each of the first carrier part and the second carrier part; and the first and second carrier part are selectively secured to one another by a plug-in connection, wherein the plug-in connection is a bolt connection and wherein four bolts may be uniformly distributed around the component, such that two bolts at the front, two bolts at the rear are provided.

* * * * *